United States Patent [19]

Sewell

[11] 3,925,711

[45] Dec. 9, 1975

[54] SERIES TUNED SPIN COIL SUPPLY

[75] Inventor: Wesley C. Sewell, Dunedin, Fla.

[73] Assignee: The United States of America as represented by the Secretary of the Air Force, Washington, D.C.

[22] Filed: Aug. 29, 1974

[21] Appl. No.: 501,725

[52] U.S. Cl. .......................... 317/123; 317/148.5 R

[51] Int. Cl.² .......................................... G05F 7/00

[58] Field of Search .............. 317/123, 148.5 R, 149

[56] References Cited

UNITED STATES PATENTS

| | | | |
|---|---|---|---|
| 3,026,454 | 3/1962 | Goodwin | 317/123 |
| 3,489,955 | 1/1970 | Freeborn | 317/123 |
| 3,596,145 | 7/1971 | Sheldon et al. | 317/123 |
| 3,673,465 | 6/1972 | Tschopp | 317/123 |

*Primary Examiner*—L. T. Hix

*Attorney, Agent, or Firm*—Joseph E. Rusz; George Fine

[57] ABSTRACT

A series tuned spin coil supply utilizes both AC and DC feedback in conjunction with a series tuning capacitor and power operational amplifier to drive a spin coil with an AC voltage whose peaks can be several times greater than the power supply voltages.

3 Claims, 1 Drawing Figure

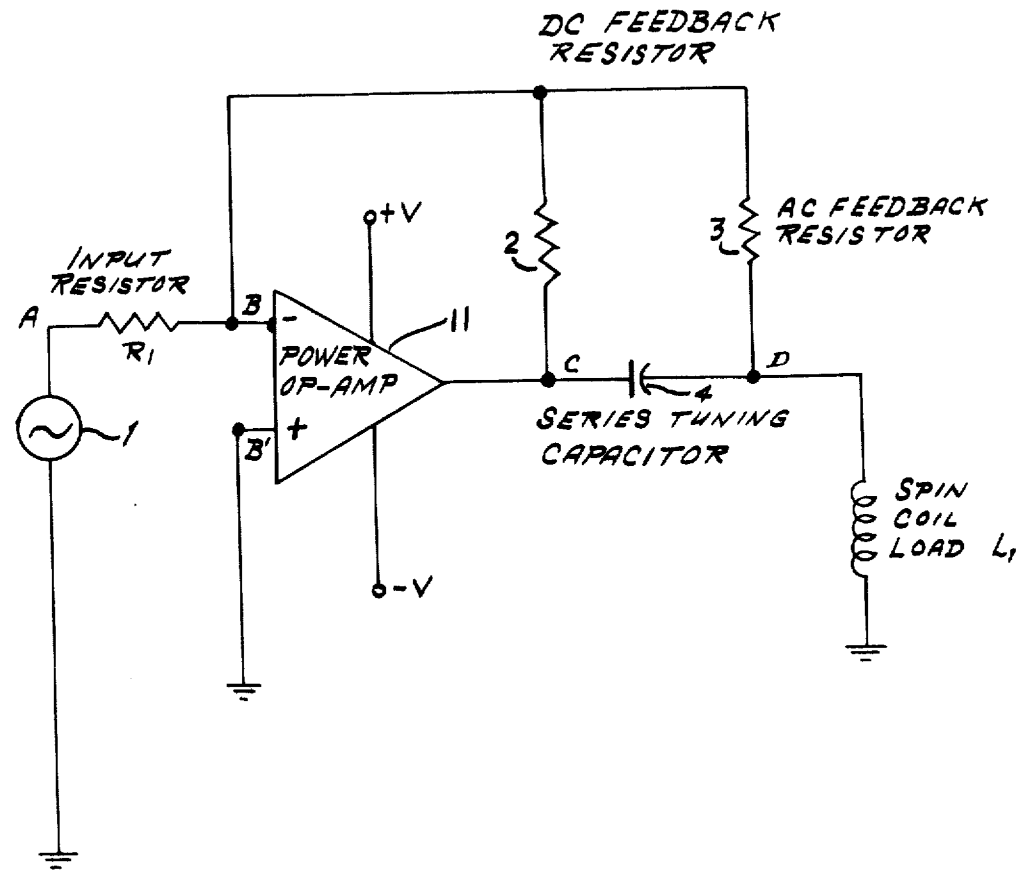
DC FEEDBACK RESISTOR
AC FEEDBACK RESISTOR
INPUT RESISTOR
A
R1
B
B'
POWER OP-AMP
11
+V
-V
2
3
C
D
4
SERIES TUNING CAPACITOR
SPIN COIL LOAD L1
1

SERIES TUNED SPIN COIL SUPPLY

BACKGROUND OF THE INVENTION

In the prior art, a transformer output class B power supply was used to drive a spin coil load. The same size tuning capacitor was required on that supply as is used with the series tuned supply. The output transformer used on this former supply which occupied about 10 cubic inches and weighed about 1 pound, is eliminated by the use of the series tuned spin coil supply. Since other circuitry for the two supplies is about the same in size, the net result is a reduction in size of 60 percent and in weight of 80 percent. Changeover to the Series Tuned Supply in the AN/ASN-101 Electronic Assembly Unit resulted in the reduction of size of the spin supply by 40 cubic inches and the weight by 4 pounds.

SUMMARY OF THE INVENTION

A series tuned spin coil supply is provided. Both AC and DC feedback is utilized in conjunction with a series tuning capacitor and a power operational amplifier to drive the spin coil with an AC voltage whose peaks can be several times greater than the power supply voltages. The series tuning capacitor is selected to resonate with the spin coil load at the operating frequency. The DC feedback maintains the average amplifier at zero volts DC and the AC feedback controls the amplitude and phase of the load voltage.

DESCRIPTION OF THE DRAWINGS

The single FIGURE illustrates a preferred embodiment of the series tuned spin and supply partly in schematic and partly in block diagram form.

DETAILED DESCRIPTION OF THE PREFERRED EMBODIMENT

Now referring to the single FIGURE, there is shown signal generator 10 connected between point A and ground generator 10 provides a sine wave input signal of preselected frequency to point A. The input signal is passed through resistor 1 to point B which is the input to power operational amplifier 11. Point B' is shown connected to ground. Power operational amplifier 11 is conventional. DC feedback resistor 2 is connected from point C, the output, to point B, the input. Series tuning capacitor 4 interconnects point C and D. Spin coil load 5 is connected between point D and ground. AC feedback resistor 3 interconnects point D and point B.

Series tuning capacitor 4 is selected to resonate with spin coil load $L_1$ at the operating frequency. With this resonant condition, the input impedance to the resonant circuit of series tuning capacitor 4 and spin coil load $L_1$ is the series resistive component of load $L_1$. When an AC voltage is applied at point C to ground, current flows through the series resonant circuit to ground. This current develops a voltage at point D that is greater than that applied at point C by the Q of the resonant circuit (a factor of 7 in the tested preferred embodiment). The voltage at point D leads the voltage at point C by almost 90 degrees in phase because of the resonant condition.

One of the unique features of this invention lies in the utilization of both AC and DC feedback. The DC feedback maintains the average amplifier output (DC bias at point C) at zero volts DC and the AC feedback controls the amplitude and phase of the load voltage at point D. Both feedback resistors 2 and 3 are equal. Because of the 90° phase difference in the voltage at points C and D and because the voltage at point D is several times greater than at point C, the total feedback will almost be equal to the feedback from point D alone. This factor makes the amplitude and phase of the load voltage at point D relatively immune to small variations in the frequency series tuning capacitor or spin coil load inductance. Without the AC feedback from the load at point D, large changes in amplitude and phase would be seen on the load with these variables.

What is claimed is:

1. A series tuned spin coil supply comprising a source of a sine wave input signal of a predetermined frequency, a power operational amplifier receiving said sine wave input signal, said power operational amplifier having input and output terminals, DC feedback means for said power operational amplifier, AC feedback means for said power amplifier, a series tuning capacitor, and a spin coil load, said series tuning capacitor and said spin coil load in a series arrangement in the recited sequence connected between said output terminal and ground with the series tuning capacitor selected to resonate with said spin coil load at said predetermined frequency.

2. A series tuned spin coil supply as defined in claim 1 wherein said DC feedback means is comprised of a DC feedback resistor connected between said input terminal and said output terminal.

3. A series tuned spin coil supply as defined in claim 2 wherein said AC feedback means is comprised of an AC feedback resistor connected between the junction of said series arrangement of said series tuned capacitor and said spin coil load and said input terminal.

* * * * *